United States Patent [19]
Tamura

[11] Patent Number: 5,870,541
[45] Date of Patent: Feb. 9, 1999

[54] COMPUTER SYSTEM CAPABLE OF OUTPUTTING STATUS DATA WITHOUT INTERRUPTING EXECUTION OF PROGRAM

[75] Inventor: Toshinori Tamura, Tokyo, Japan

[73] Assignee: NEC Corporation, Tokyo, Japan

[21] Appl. No.: 597,801

[22] Filed: Feb. 7, 1996

[30] Foreign Application Priority Data

Feb. 7, 1995 [JP] Japan .................................... 7-042516

[51] Int. Cl.[6] ................................................. G06F 11/00
[52] U.S. Cl. ............................... 395/184.01; 395/183.04; 395/183.06
[58] Field of Search ................... 395/184.01, 182.09, 395/183.01, 183.13, 183.2, 185.01, 183.04, 183.16, 183.05, 183.06, 183.07; 364/266, 264.6, 963.9, 232.3

[56] References Cited

U.S. PATENT DOCUMENTS

| | | | |
|---|---|---|---|
| 4,326,266 | 4/1982 | Davis et al. | 395/183.06 |
| 4,539,682 | 9/1985 | Herman et al. | 395/183.06 |
| 4,674,089 | 6/1987 | Poret et al. | 395/183.04 |
| 4,789,924 | 12/1988 | Fukuta | 395/500 |
| 4,996,688 | 2/1991 | Byers et al. | 395/183.21 |
| 5,088,022 | 2/1992 | Iwata | 395/183.07 |
| 5,088,027 | 2/1992 | Tanagawa et al. | 395/183.03 |
| 5,193,177 | 3/1993 | Burri | 395/183.19 |
| 5,280,626 | 1/1994 | Kondo et al. | 395/500 |
| 5,313,618 | 5/1994 | Pawloski | 395/500 |
| 5,416,919 | 5/1995 | Ogino et al. | 395/183.06 |
| 5,479,649 | 12/1995 | Runaldue et al. | 395/183.07 |
| 5,488,688 | 1/1996 | Gonzales et al. | 395/183.1 |
| 5,537,536 | 7/1996 | Groves | 395/183.04 |
| 5,539,901 | 7/1996 | Ramirez | 395/500 |
| 5,596,716 | 1/1997 | Byers et al. | 395/185.01 |

OTHER PUBLICATIONS

IEEE Journal of Solid–State Circuits, vol. 26, Nov. 1991, pp. 1662–1667.

*Primary Examiner*—Joseph Palys
*Attorney, Agent, or Firm*—Foley & Lardner

[57] ABSTRACT

A computer system such as a debugging system for a microcomputer system includes a display unit and a supervisor for receiving at least one of the plurality of status data from the microcomputer system independently from the execution of a program in the microcomputer system and displaying the read status data on the display unit. The microcomputer system includes the plurality of peripheral circuits respectively having status flags, each of which stores the status data of the corresponding peripheral circuit, and a CPU executing the program. The status data are updated as the execution of the program and the CPU can read the status data of each of the status flags. An emulation control circuit generates a status clock signal independently from the execution of the program by the CPU and a selector sequentially and repeatedly selects one of the plurality of status data in response to the status clock signal to output the selected status data to the supervisor.

22 Claims, 11 Drawing Sheets

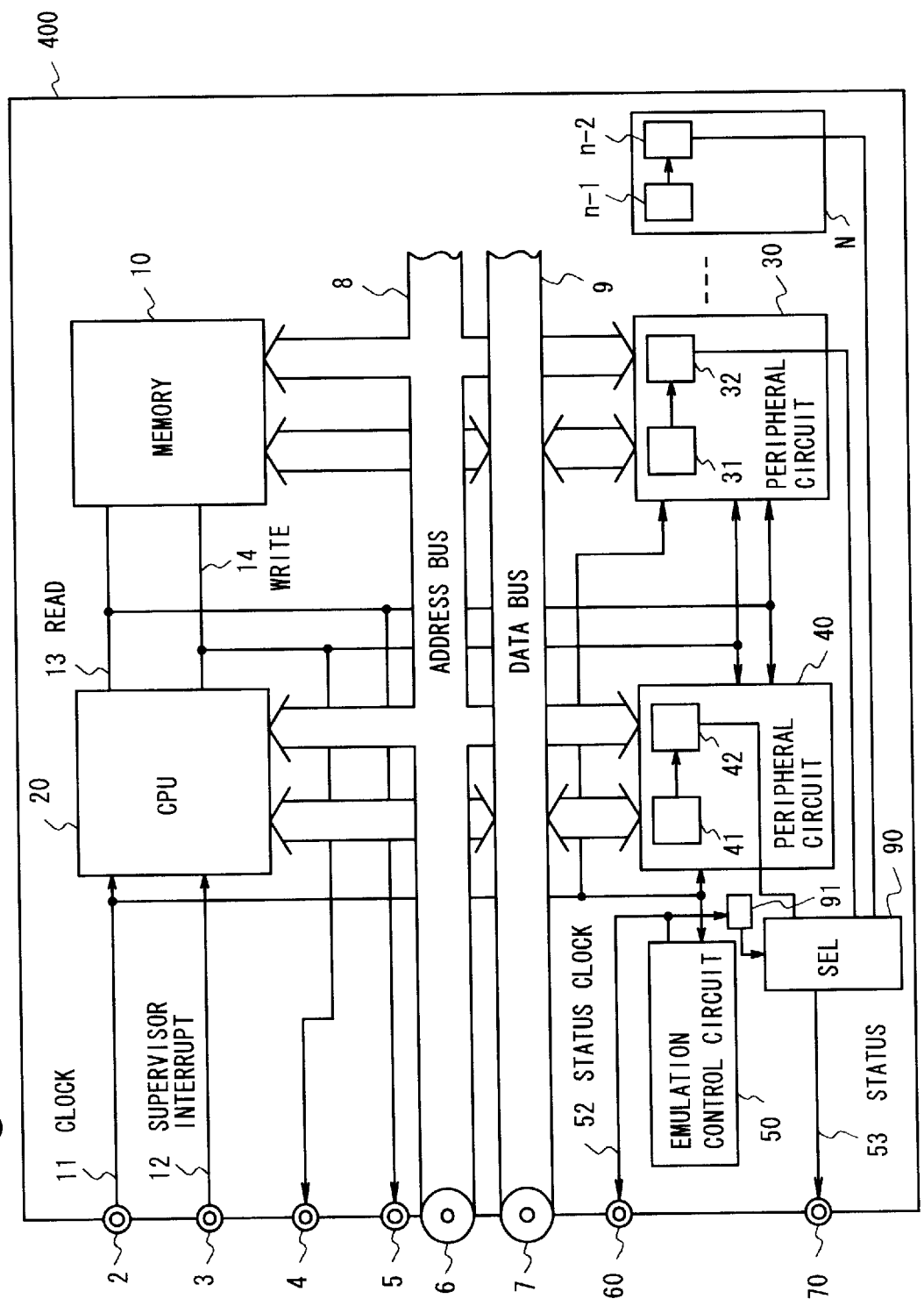

COMPUTER SYSTEM CAPABLE OF OUTPUTTING STATUS DATA WITHOUT INTERRUPTING EXECUTION OF PROGRAM

BACKGROUND OF THE INVENTION

1. Field of the Invention

The present invention relates to an emulation device for a single chip microcomputer, and more particularly, to an emulation device for a single chip microcomputer capable of outputting internal status information of a peripheral circuit in a real time manner.

2. Description of Related Art

As an electronic apparatus containing a single chip microcomputer recently becomes more complicated, the amount of software to be executed by the microcomputer increases. On the other hand, the life cycle of such an electronic apparatus is relatively short. As a result, it is important to develop the software in a short time. Therefore, there is a demand for a single chip microcomputer having high level function and performance such that the software can be readily developed using the microcomputer.

In developing software, it is necessary to acquire status information of a peripheral circuit to be controlled by the single chip microcomputer. Specifically, in developing an application program for a real time control system, it is important to collect debugging information such as status information of a peripheral circuit which operates asynchronously with the execution of the program and to display the debugging information on a monitor to show the execution state of the program to a programmer for further increased development efficiency.

FIG. 1 is a diagram of a conventional debugging system generally used to develop the software for the single chip microcomputer. The debugging system is composed of a personal computer 500 and an in-circuit emulator 700 having an in-circuit emulator and connected a target system 600, for emulating the target system 600 while outputting status information. FIG. 2 is a block diagram of the conventional in-circuit emulator 700 for a single chip computer of the microcomputer system. Referring to FIG. 2, the in-circuit emulator 700 is composed of a supervisor CPU 1001 and an emulator chip device 1000. The emulator chip device 1000 emulates the actual operation of a system as a target of emulation. The supervisor CPU 1001 control the whole of emulation operation, monitors signals on an address bus 102 and data bus 103 to control of the emulation chip device 1000, and outputs debug information to the screen of a monitor 1009 via an external bus 1008. Also, the supervisor CPU 1001 sets a supervisor interrupt signal to an active state to temporarily stop the execution of the program by the emulator chip device 1000 and then executes a read instruction to read status data stored in registers in the emulator chip device 1000.

FIG. 3 is a block diagram of the internal structure of the emulator chip device 1000. Referring to FIG. 3, the read operation of status data from peripheral circuits built in the emulator chip device 1000 will be described. As shown in FIG. 3, the emulator chip device 1000 is composed of a central processing unit (CPU) 1020, memory 1010, peripheral circuits 1030 and 1040, and terminals 1022, 1023, 1024, 1025, 1026 and 1027 which are respectively connected to a clock signal 1011, a supervisor interrupt signal 1012, a read signal 1013, a write signal 1014, an address bus 1018 and a data bus 1019. The peripheral circuits 1030 and 1040 are composed of peripheral control circuits 1031 and 1041 for operating as peripheral functions and peripheral status flags 1032 and 1042 for storing the operation results of the peripheral control circuits 1031 and 1041. The peripheral status flags 1032 and 1042 are generally memory mapped. Accordingly, the CPU 1020 can read the state of each flag by use of the address bus 1018, the data bus 1019 and the read signal 1013.

The read signal is outputted from the CPU 1020 to the memory 1010, the peripheral circuits 1030 and 1040, and the external terminal 1025. The write signal 1014 is outputted from the CPU 1020 to the memory 1010, the peripheral circuits 1030 and 1040 and the external terminal 1024. The clock signal 1011 is supplied from the supervisor CPU 1001 to the CPU 1020, the peripheral circuits 1030 and 1040 via the external terminal 1022. The supervisor interrupt signal 1012 is supplied from the supervisor CPU 1001 to the CPU 1020 via the external terminal 1023.

Next, the operation will be described in a case where the program is temporally stopped during the emulation such that the supervisor CPU 1001 can read status data from the peripheral status flag 1042. The supervisor CPU 1001 set the supervisor interrupt signal 1007 to "1", i.e., an active state and transmits it to the emulator chip device 1000 as the supervisor interrupt signal 1012 via the external terminal 1023. The emulator chip device 1000 detects that the supervisor interrupt signal 1012 is "1" and stops the execution of the user program. Then, the supervisor CPU 1001 issues a read command to the emulation chip device 1000 via the data buses 1003 and 1019 via the external terminal 7. The CPU 1020 sets the read signal 1013 to "1" in response to the read command from the supervisor CPU 1001 to read data of the peripheral status flag 1042 by use of the address bus 1018 and the data bus 1019. The CPU 1020 supplies the read data to the supervisor CPU 1001 via the data buses 1019 and 1003 and the external terminal 1027. When receiving the data, the supervisor CPU 1001 outputs the data to a monitor 1009 via the external bus 1008 such that the status data is displayed.

As described above, in the conventional debugging system using a microcomputer system, in order to read the data of the peripheral status flag, the execution of the user program by the CPU 1020 is interrupted in response to the supervisor interrupting signal from the supervisor CPU 1001. For this reason, the data of the peripheral status flag which changes with time cannot be emulated in a real time manner without interrupting the execution of the user program. Alternatively, it could be considered that instructions for reading and outputting the data of the peripheral status flag to the supervisor CPU are incorporated in the user program in advance and the instructions are executed to output the data. In this case, however, the user program needs to be rewritten after debugging and it is complicated.

SUMMARY OF THE INVENTION

An object of the present invention is to provide a method and apparatus of outputting a plurality of status data of a plurality of peripheral circuits without interrupting the execution of a user program and without rewriting the user program for development of the program.

Another object of the present invention is to provide a method and apparatus for outputting a plurality of status data changing with time repeatedly in a real time manner.

Still another object of the present invention is to provide a method and apparatus capable of immediately interrupting the execution of a user program when an arbitrary one of the plurality of status data is changed and displaying status data at that time.

In order to achieve an aspect of the present invention, a computer system includes a bus, a central processing unit (CPU) connected to the bus, for executing a program, a plurality of peripheral circuits connected to the bus and respectively having status flags, each of which stores status data of a corresponding peripheral circuit, each status data capable of being changed during the execution of the program by the CPU, a control signal generating section for generating a control signal independently from the execution of the program by the CPU, and a selecting section connected to the status flags, for selecting one of the plurality of status data in response to the control signal to output the selected status data to a circuit other than the CPU.

In another aspect of the present invention, a computer system for a microcomputer system includes a display unit, a microcomputer system having a plurality of peripheral circuits, for executing a program, wherein a status data indicative of a state of each of the plurality of peripheral circuits is capable of being changed during the execution of the program, and a supervisor for receiving at least one of the plurality of status data from the microcomputer system independently from the execution of the program in the microcomputer and displaying the received status data on the display unit.

The control signal generating section outputs the control signal to the supervisor, such that the supervisor can determine which of the plurality of peripheral circuits the status data is received from. If the control signal generating section continuously generates the control signal, the plurality of status data can be sequentially and repeatedly outputted to the supervisor, resulting in providing the operating circumstances of the program in real time. The supervisor may interrupt the execution of the program in the CPU in response to a change of at least one of the plurality of status data. If the control signal generating section generates the control signal in response to a generation control data from the circuit, the circuit can know the states of the plurality of peripheral circuits in the microcomputer at an arbitrary time.

In order to achieve still another aspect of the present invention, a method of acquiring a plurality of status data indicative of statuses of a plurality of peripheral circuits without interrupting the execution of a program by a CPU, includes the steps of:

setting the plurality of status data in the plurality of peripheral circuits during the execution of the program by the CPU;

generating a control signal independently from the execution of the program by the CPU;

selecting and outputting one of the plurality of status data in response to the control signal.

BRIEF DESCRIPTION OF THE DRAWINGS

FIG. 11 is a block diagram of the internal structure of an emulator chip device according to a fourth embodiment of the present invention.

DESCRIPTION OF THE PREFERRED EMBODIMENTS

The debugging system including an emulator chip device using a microcomputer system according to the present invention will be described below with reference to the accompanying drawings.

Figure 1:
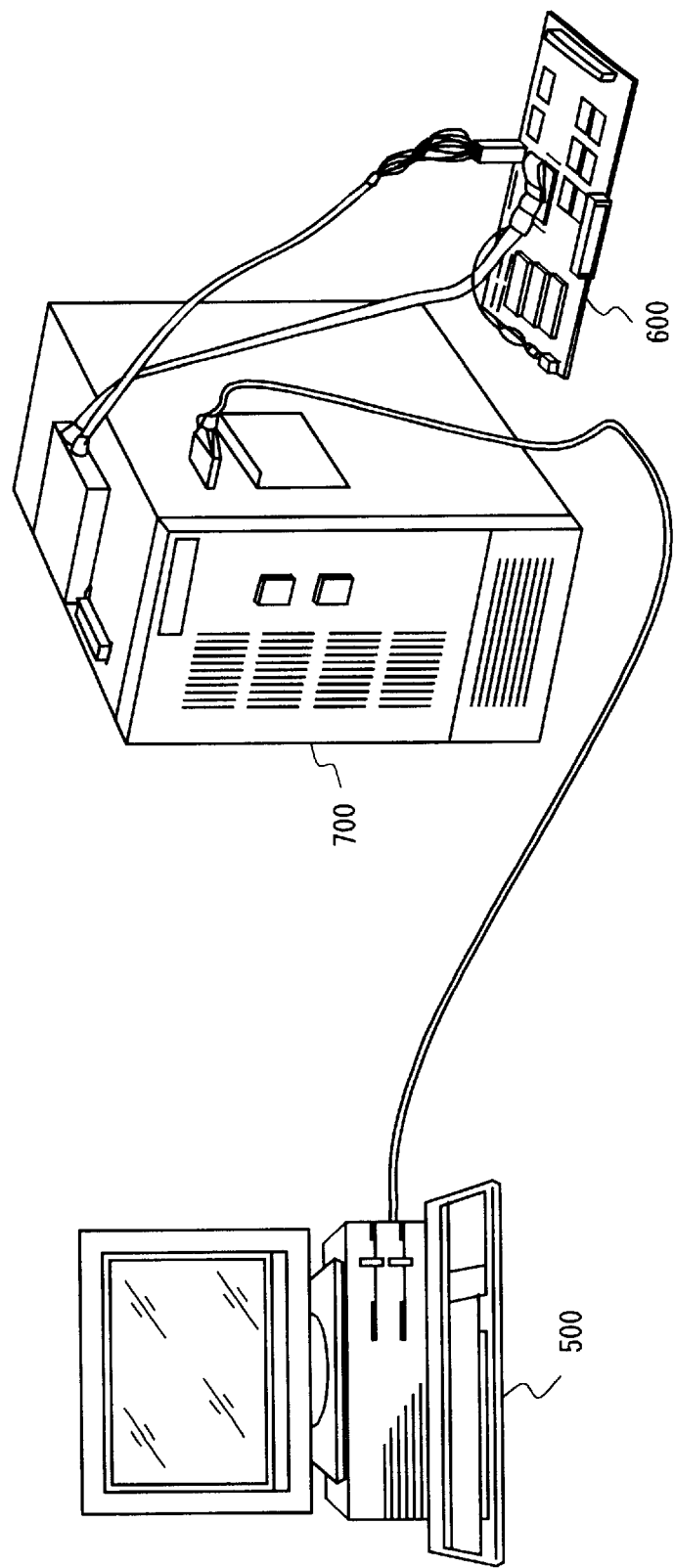
FIG. 1 is a schematic diagram of a conventional debugging system for a microcomputer system.
Figure 2:
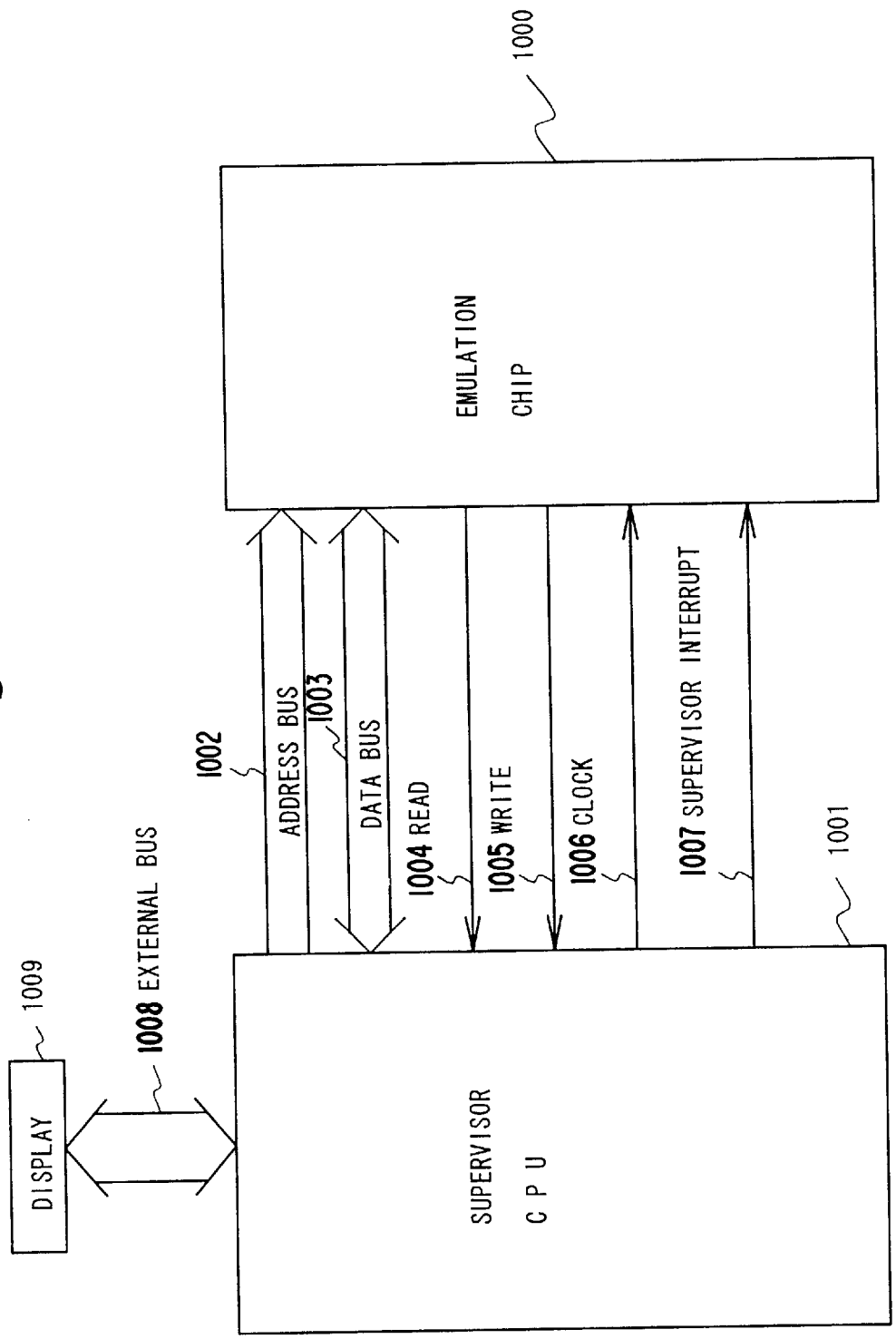
FIG. 2 is a block diagram illustrating a conventional emulator system composed of a supervisor CPU and an emulator chip device.
Figure 3:
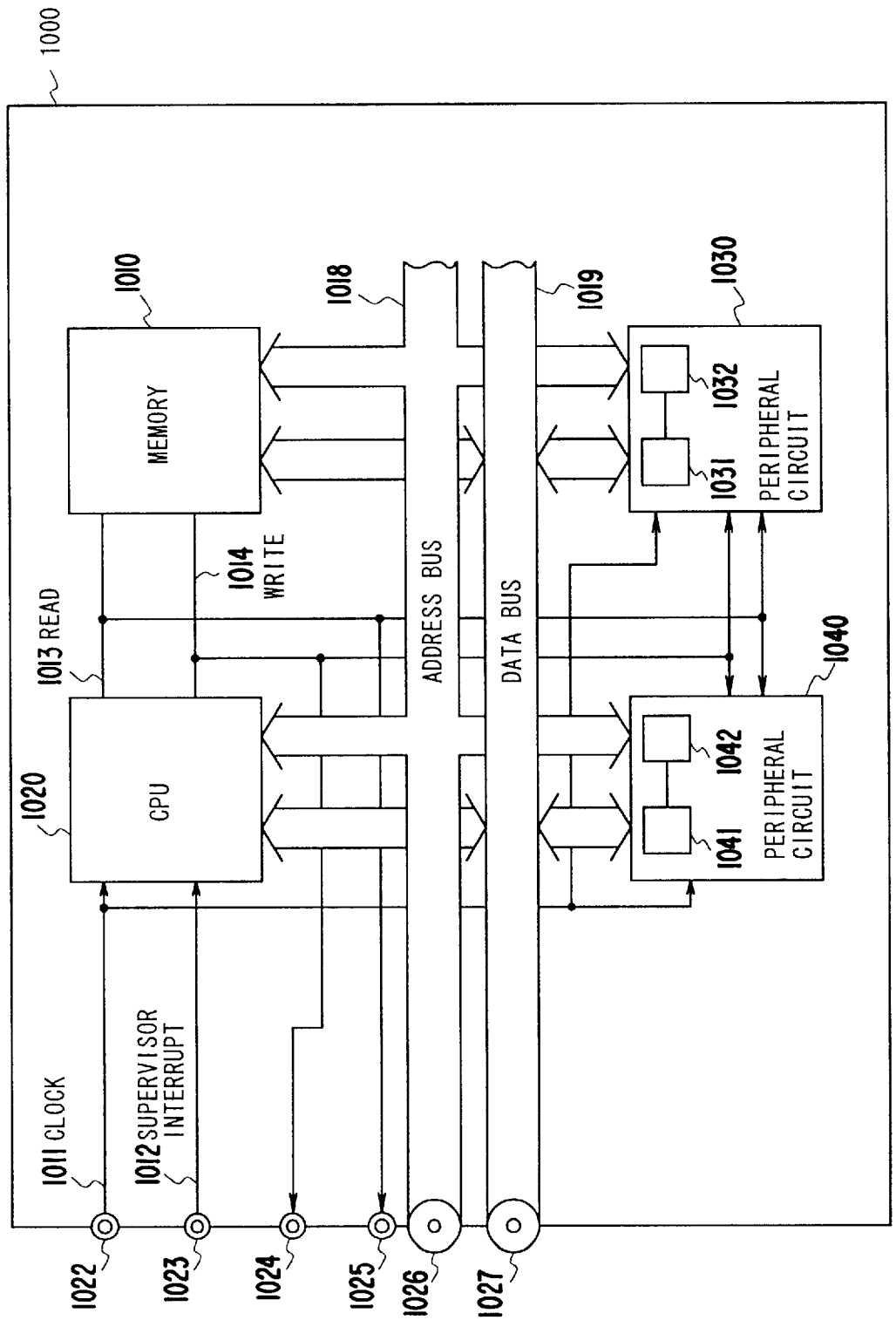
FIG. 3 is a block diagram of the internal structure of the emulator chip device shown in FIG. 2.
Figure 4:
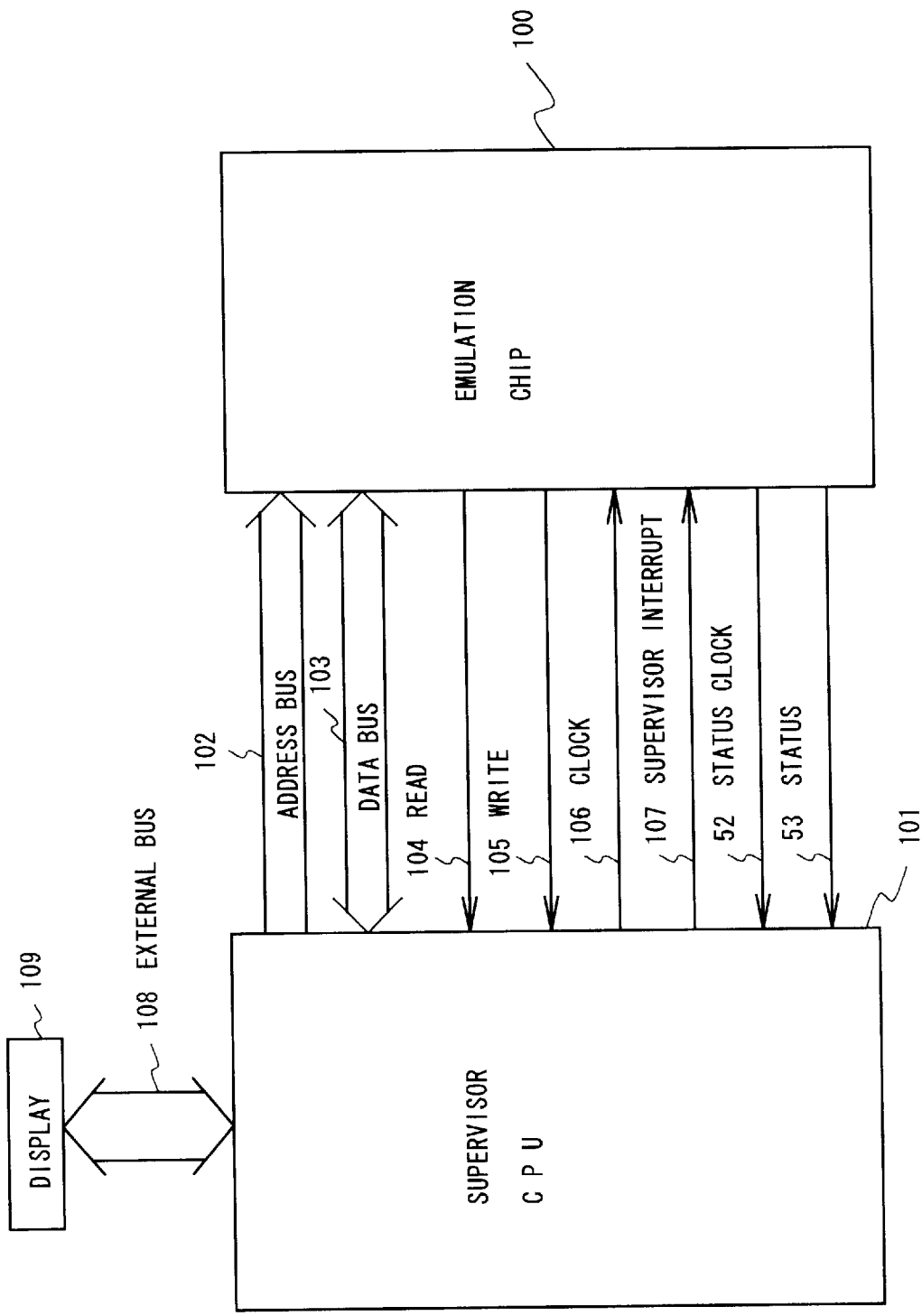
FIG. 4 is a block diagram illustrating an emulator system composed of a supervisor CPU and an emulator chip device according to a first embodiment of the present invention.

FIG. 4 is a block diagram illustrating the debugging system according to the present invention. Referring to FIG. 4, the debugging system is composed of an emulation chip device 100, a supervisor CPU 101 and a display unit 109. The supervisor CPU 101 and the display unit 109 are connected by an external bus 108. The supervisor CPU 101 and the emulation chip device 100 are connected by an address bus 102, and lines for a data bus 103, a read signal 104, a write signal 105, a clock signal 106, a supervisor interrupt signal 107, a status clock 52, and a status signal 53. The supervisor CPU 101 issues the supervisor interrupt signal 107 to the emulation chip device 100 and outputs an address and instruction to the emulation chip device 100 on the address bus 102 and data bus 103, if necessary. When receiving the status data of peripheral circuits, the supervisor CPU 101 outputs the status data to the display unit 109 via the external bus 108 such that the status data is displayed.

Figure 5:
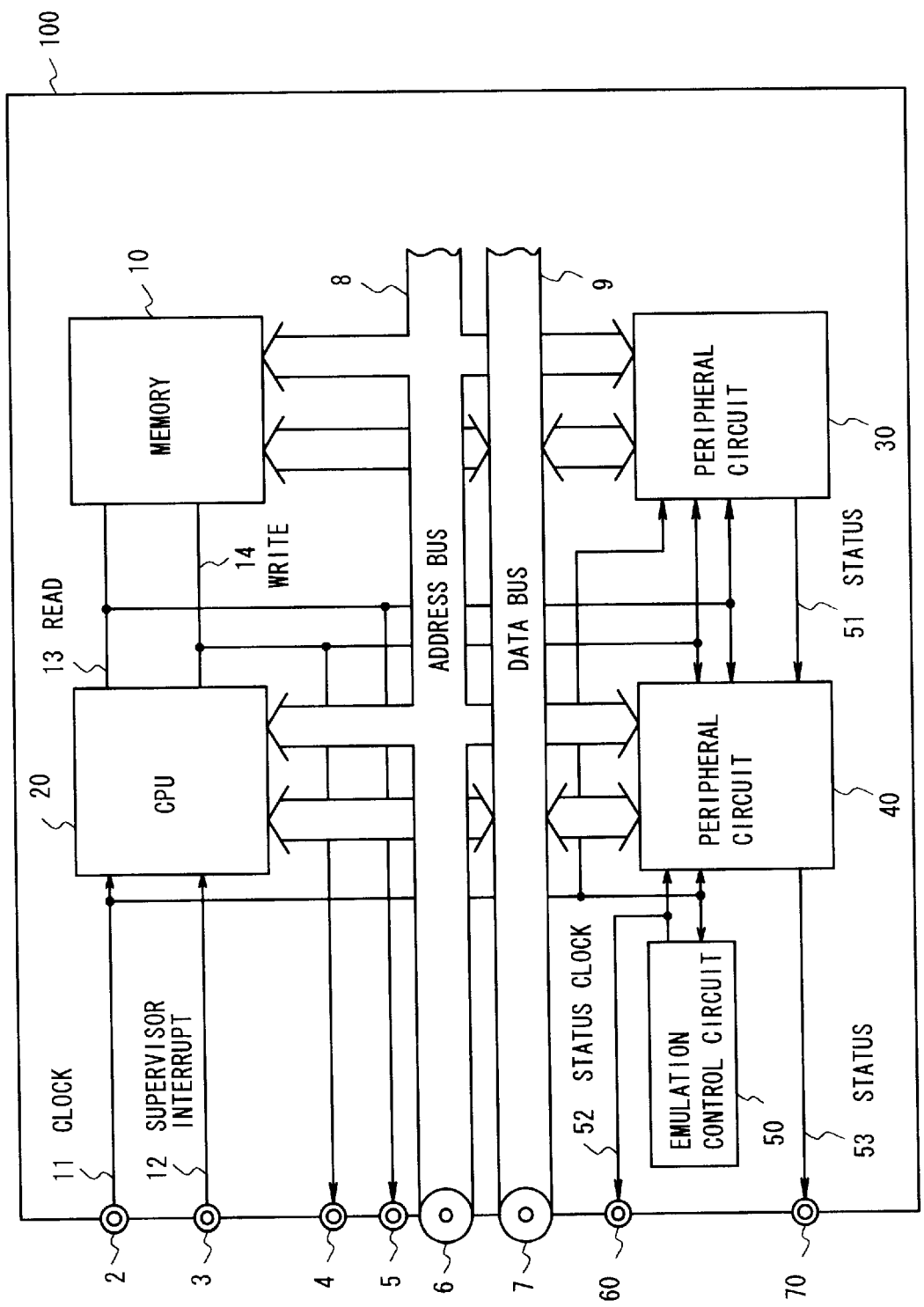
FIG. 5 is a block diagram of the internal structure of an emulator chip device according to the first embodiment of the present invention.

FIG. 5 is a block diagram illustrating the internal structure of the emulator chip device 100 according to the first embodiment of the present invention. Referring to FIG. 5, the emulator chip device 100 includes a central processing unit (CPU) 20, a memory 10, peripheral circuits 30 and 40 which are connected to an address bus 8 and a data bus 9 which are respectively connected to external terminals 6 and 7. The emulation chip device 100 further includes an emulation control circuit 50 which generates the status clock signal 52. A clock signal 11 and a supervisor interrupt signal 12 are supplied from the supervisor CPU 101 to the CPU 20 via external terminals 2 and 3. The clock signal 11 is also supplied to the peripheral circuits 30 and 40 and the emulation control circuit 50. The CPU 20 supplies a read signal 13 and a write signal 14 to the memory 10 and the peripheral circuits 30 and 40. The read signal 13 and the write signal 14 are connected to external terminals 4 and 5 such that these signals are also supplied to the supervisor CPU 101. A status clock signal 52 is connected to external terminal 60 and supplied from the emulation control circuit 50 to the peripheral circuits 30 and 40. The peripheral circuit 30 supplies a status signal 51 to the peripheral circuit 40 which supplies the status signal 53 to an external terminal 70. The read signal 13 is outputted from the CPU 20 to the memory 10, the peripheral circuits 30 and 40, and the external terminal 5. The write signal 14 is outputted from the CPU 20 to the memory 10, the peripheral circuits 30 and 40 and the external terminal 4. The clock signal 11 is supplied from the supervisor CPU 101 to the CPU 20, the peripheral circuits 30 and 40 via the external terminal 2. The supervisor interrupt signal 12 is supplied from the supervisor CPU 101 to the CPU 20 via the external terminal 3.

Figure 6:
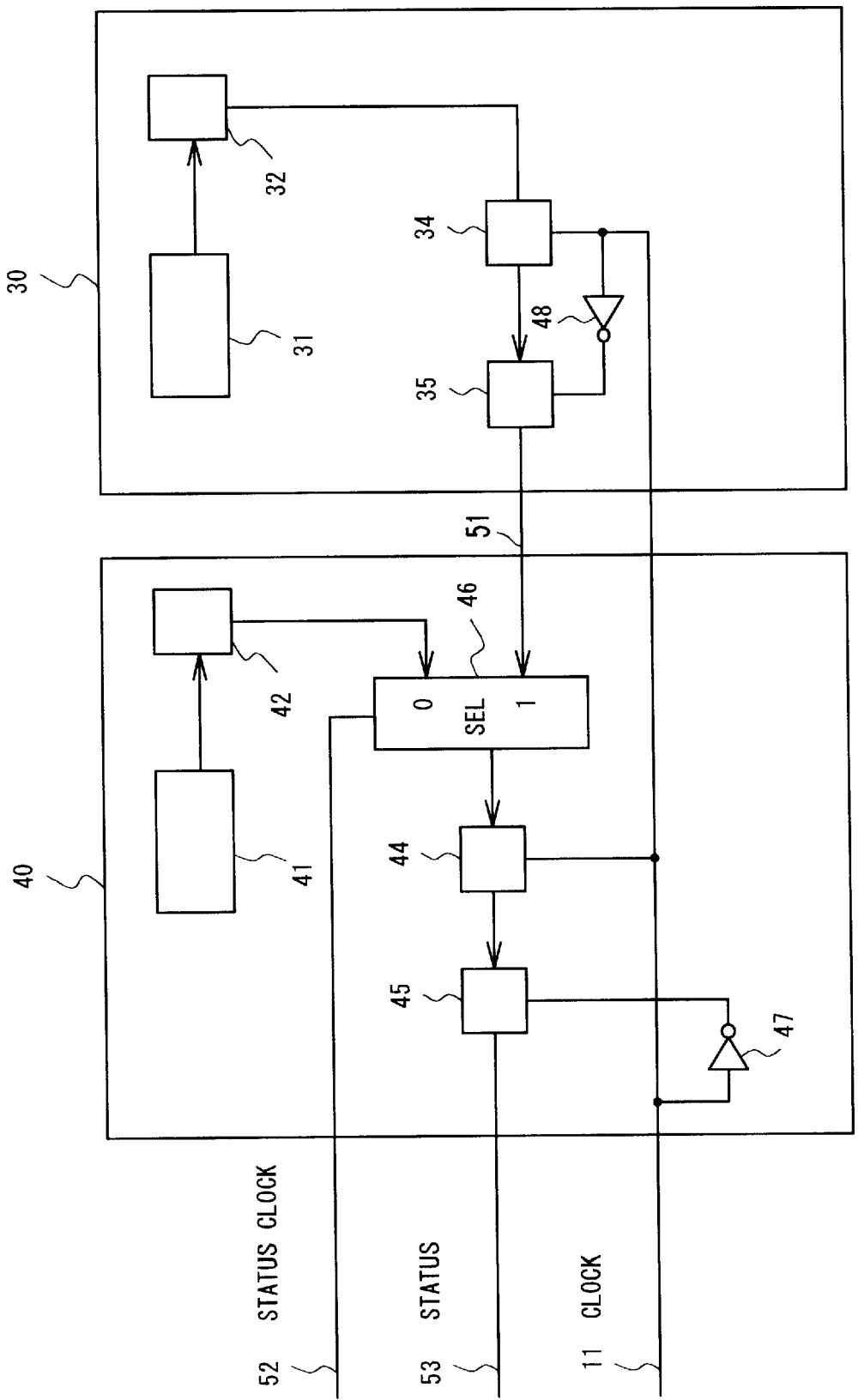
FIG. 6 is a block diagram of peripheral circuits of the emulator chip device shown in FIG. 5.

FIG. 6 is a block diagram illustrating the internal structure of the peripheral circuits 30 and 40. Referring to FIG. 6, the peripheral circuit 30 is composed of a peripheral control circuit 31, a peripheral status flag 32 connected to the peripheral control circuit 31, a shift flag 34 connected to the peripheral status flag 32, a shift flag 35 connected to the shift flag 34, and an inverter 48 connected between the shift flags 34 and 35. The clock signal 11 is supplied directly to the shift flag 34 and indirectly to the shift flag 35 via the inverter 48. The output of the shift flag 35 is outputted as the status signal 51. The peripheral circuit 40 is composed of a peripheral control circuit 41, a peripheral status flag 42 connected to the peripheral control circuit 41 and a selector 46 connected to the peripheral status flag 42. The selector 46 is supplied with the output of the shift flag 35, the output of the peripheral status flag 42, and the status clock signal 52. The peripheral circuit 40 further includes a shift flag 44 connected to the output of the selector 46 and a shift flag 45 connected to the shift flag 44. The clock signal 11 is supplied directly to the shift flag 44 and indirectly to the shift flag 45 via an inverter 47. The output of the shift flag 45 is outputted as the status signal 53. The selector 46 selects the peripheral status flag 42 when the status clock signal 52 is "0" and the status signal 51, i.e., the output of the shift flag 35 when the status clock signal 52 is "1". The status clock 52 has a period twice longer than that of the clock signal 11 and is alternately switched between "1" and "0" in this embodiment. Therefore, if the status clock 52 is continuously generated by the emulation control circuit 50, the status data of the peripheral status flags 32 and 42 can be sequentially and repeatedly outputted. Of course, the status clock 52 may have, a single pulse.

As described above, the peripheral circuits 30 and 40 includes the peripheral control circuits 31 and 41 for operating as peripheral functions and the peripheral status flags 32 and 42 for storing the operation results of the peripheral control circuits 31 and 41. Peripheral circuits built in a microcomputer include, for example, a timer for counting clock pulses to inform a predetermined time period to the CPU 20, and an interface circuit for transmitting and receiving data and commands to and from an external device. For such a peripheral circuit, a peripheral status flag is provided to inform the state of the peripheral circuit to the CPU 20. For instance, if the peripheral circuit 30 is the timer, an overflow flag is set as the peripheral status flag 32 by the peripheral control circuit 31 when the predetermined time period is elapsed. By referring to the peripheral status flag 32, the CPU 20 can determine whether the predetermined time period is elapsed. Further, if the peripheral circuit 40 is a serial interface circuit, an error flag is set as the peripheral status flag 42 by the peripheral control circuit 41 to indicate whether communication is correctly executed. The error flag is reset in the initial state. In a case where the microcomputer transmits data to a destination device, the destination device determines whether the data is correctly received and returns an acknowledge signal when the data is correctly received. The error flag is set when the microcomputer has transmitted the data but the acknowledge signal is not returned from the destination device. By referring to the error flag, the CPU 20 can determine whether the communication is normally executed or any communication error occurs. As described above, the peripheral status flags 32 and 42 are flags such as the overflow flag and error flag which change in accordance with the operation results of the peripheral circuits. The peripheral status flags 32 and 42 are generally memory mapped, i.e. have addresses which can be accessed by the CPU 20. Accordingly, the CPU 20 can read the state of each flag by using the address bus 8, the data bus 9 and the read signal 13. However, in this case, it is necessary for instructions to be written in the user program executed by the CPU 20 in advance.

Figure 7:
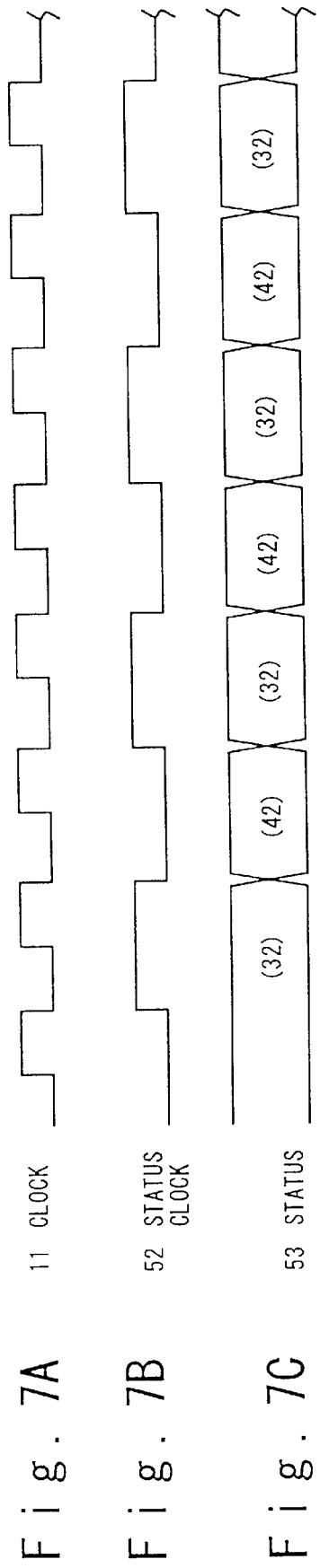
FIGS. 7A to 7C are timing charts showing the waveforms of a clock signal, status clock signal and status signal, respectively.

Next, the operation of the debugging system according to the first embodiment will be described with reference to FIGS. 7A to 7C. The clock signal 11 is supplied from the supervisor CPU 101 to the emulation control circuit 50, as shown in FIG. 7A. The emulation control circuit 50 continuously generates the status clock signal 52 which has a period twice as long as that of the clock signal 11, as shown in FIG. 7B. The status clock signal 52 is also supplied to the supervisor CPU 101. The clock signal 11 is also supplied to the shift flags 34 and 44. The shift flag 34 latches the status data stored in the peripheral status flag 32 in response to the rising edge of the clock signal 11. Since the clock signal 11 is inverted by the inverter 48 and supplied to the shift flag 35, the shift flag 35 latches the latched status data in the shift flag 34 in response to the falling edge of the clock signal 11 and outputs the status data as the status signal 51 to the selector 46. The selector 46 is supplied with the status data stored in the peripheral status flag 42. The selector 46 selects one of the output of the peripheral status flag 412 and the status signal 51 in response to the status clock signal 52. Since the status clock signal 52 alternately has the values of "1" and "0", the output of the peripheral status flag 42 and the status signal 51 are alternately outputted to the shift flag 44. Since the clock signal 11 is supplied to the shift flag 44, the output of the selector 46 is latched by the shift flag 44 in response to the rising edge of the clock signal 11, like the shift flag 34. Further, since the clock signal 11 is supplied to the shift flag 45 via the inverter 47, the output of the shift flag 44 is latched by the shift flag 45 in response of the falling edge of the clock signal 11 and is outputted as the status signal 53 to the supervisor CPU 101 via the terminal 70. That is, the status data are outputted in synchronous with and in correspondence with the status clock signal 52. When receiving the status signal 53, the supervisor CPU 101 outputs data indicated by the status signal 53 to the display unit 109 via the external bus 108. In this manner, the status data stored in the peripheral flags 32 and 42 are continuously transferred to the supervisor CPU 101 and displayed. Therefore, even if the statuses of the peripheral circuits 30 and 40 are changed during the execution of a user program by the CPU 20, the supervisor CPU 101 can detect the change of status data in a real time manner. Further, the supervisor CPU 101 can know which of the status data for the peripheral circuits 30 and 40 is changed because the status clock signal 52 is supplied from the emulation control circuit 50. In addition, the supervisor CPU 101 can interrupt the execution of the user program in response to the change of status data.

Figure 8:
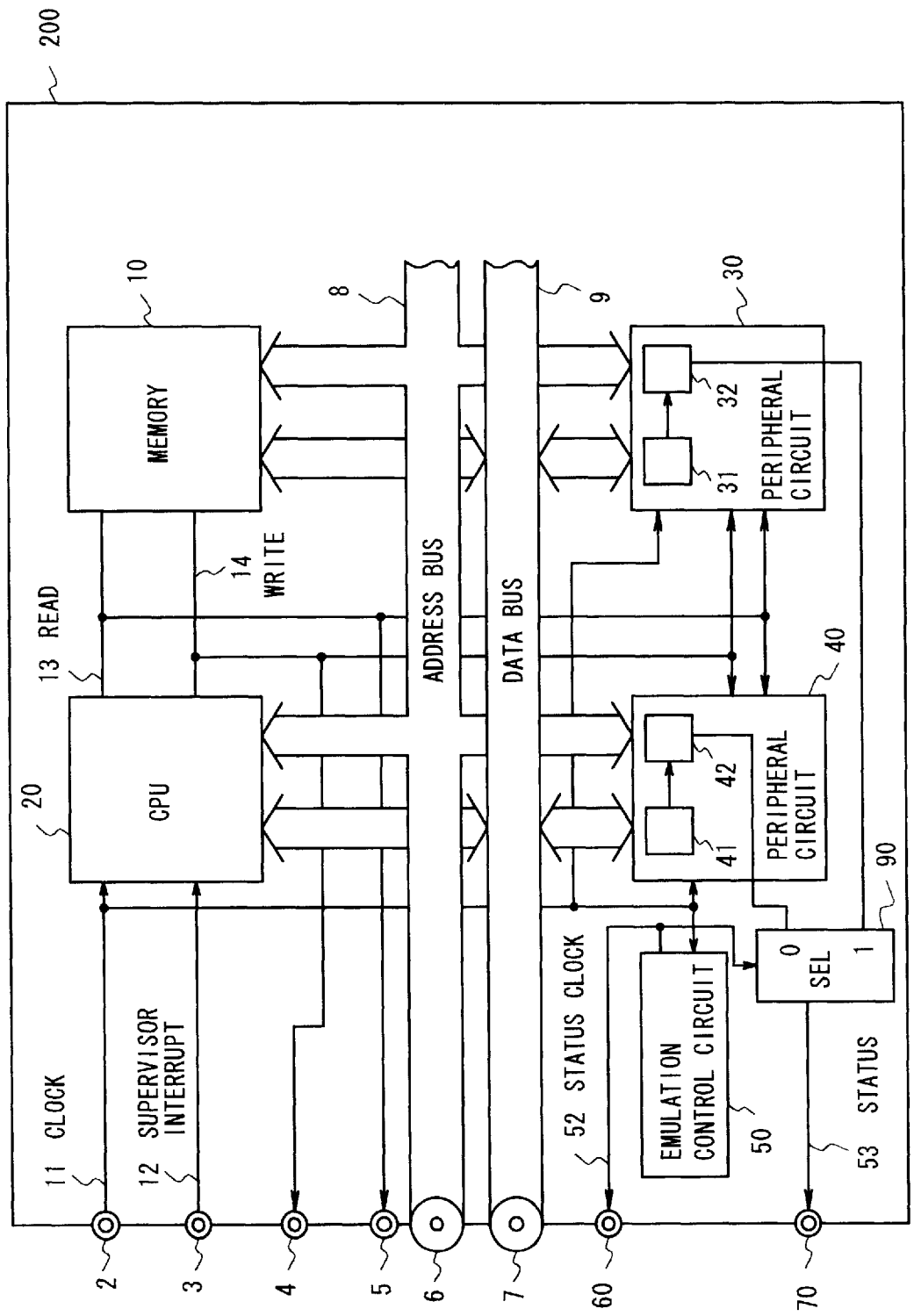
FIG. 8 is a block diagram of the internal structure of an emulator chip device according to a second embodiment of the present invention.
Figure 9:
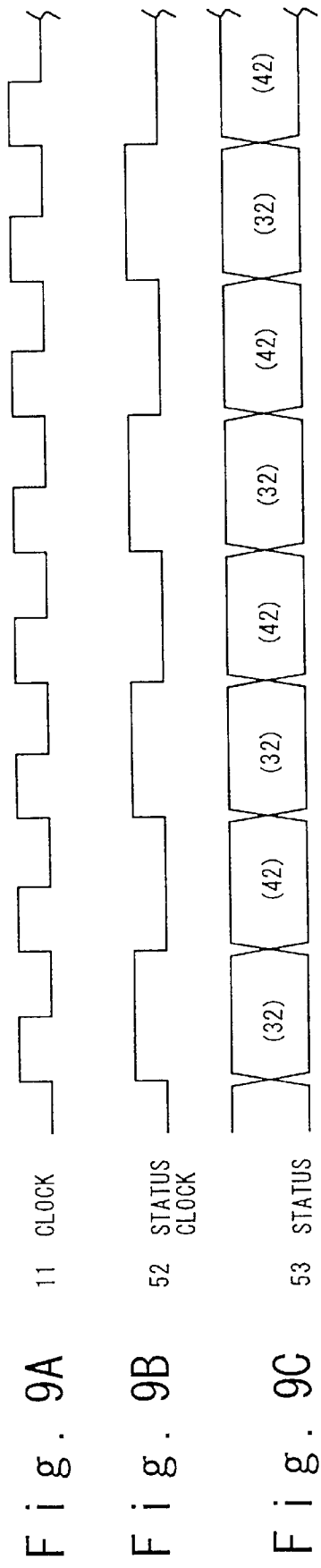
FIGS. 9A to 9C are timing charts showing the waveforms of a clock signal, status clock signal and status signal, respectively.

Next, the debugging system according to the second embodiment will be described with reference to FIG. 8. The same components are assigned with the same reference numerals and the description is omitted. Referring to FIG. 8, in this embodiment, a selector 90 is provided in place of the shift flags 34, 35, 44 and 45 and selector 46. The structure is simplified. The inputs of the selector 90 are connected to the peripheral status flags 32 and 42. The status clock signal 52 having the same waveform as in the first embodiment, as shown in FIG. 9B is supplied to a control terminal of the selector 90. Therefore, similar to the first embodiment, the status data are outputted from the selector 90 as the status signal 53, as shown in FIG. 9C.

Figure 10:
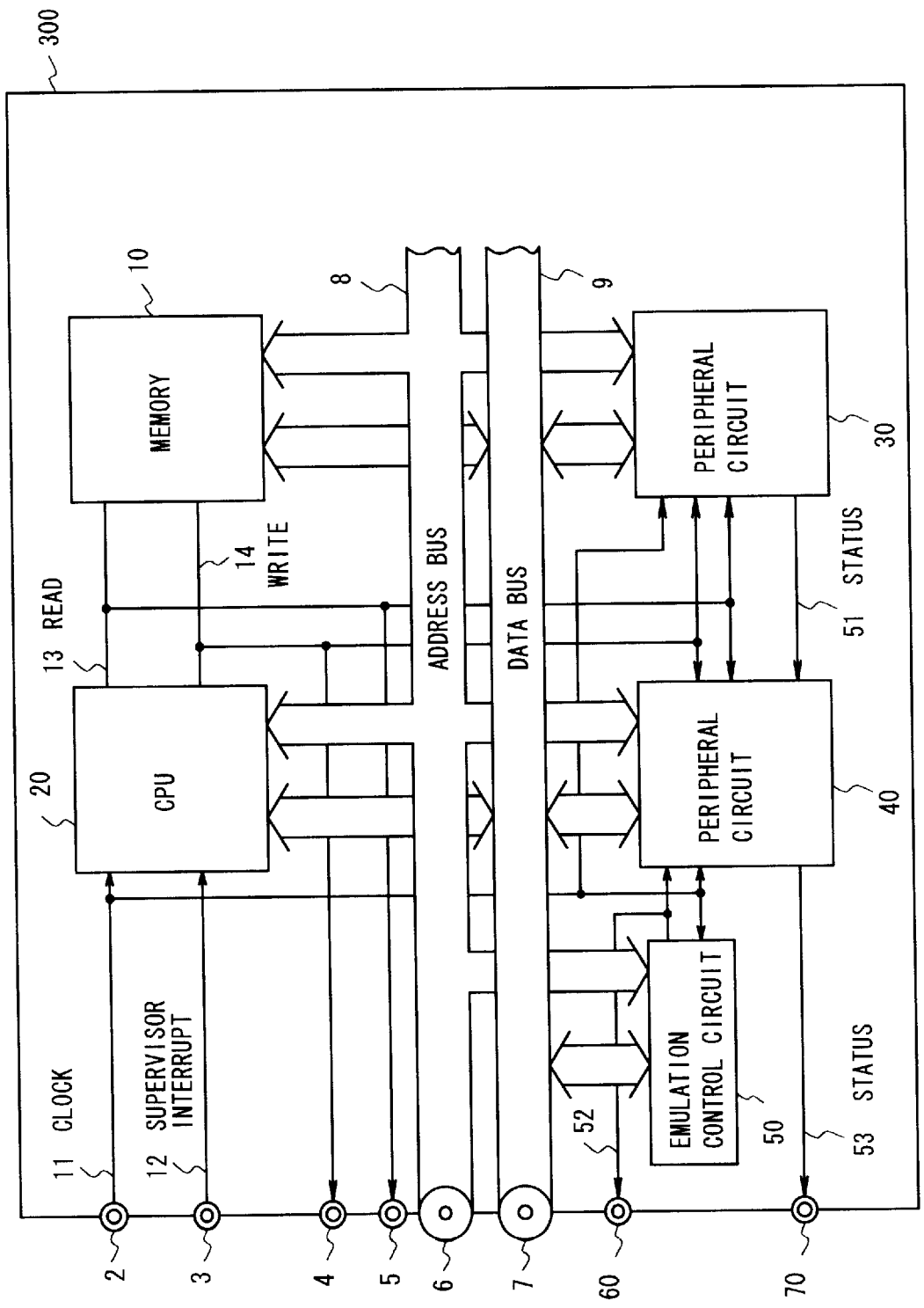
FIG. 10 is a block diagram of the internal structure of an emulator chip device according to a third embodiment of the present invention.

Next, the debugging system according to the third embodiment of the present invention will be described with reference to FIG. 10. Referring to FIG. 10, in the third embodiment, the emulation control circuit 50 is connected to the address bus 8 and the data bus 9. Thus, the generation of the status clock signal 52 can be controlled by the supervisor CPU 101. That is, a generation start instruction and a generation stop instruction are issued from the supervisor CPU 101 to the emulation control circuit 50. Thus, unnecessary data can be prevented from being transmitted and the supervisor CPU 101 can receive only necessary data.

Next, the debugging system according to the fourth embodiment of the present invention will be described with reference to FIG. 11. Referring to FIG. 11, in the fourth embodiment, more than three peripheral circuits 30, 40, and N are provided and connected to the selector 90. Further, a circuit 91 such as a counter or decoder is provided. The circuit 91 counts the status clock signal 52 or decodes the status clock signal 52. The output of the circuit 91 is supplied to the control terminal of the selector 90. Thus, one of the status data for the peripheral circuits can be selected.

What is claimed is:

1. A computer system comprising:

a bus;

a central processing unit (CPU) connected to the bus, for executing a program;

a plurality of peripheral circuits connected to the bus and respectively having status flags, each of which stores status data of a corresponding peripheral circuit, wherein each status data is capable of being changed during the execution of the program by said CPU, and wherein said CPU can read said each status data;

control signal generating means for continuously generating a control signal independently from the execution of the program by said CPU, such that said status data are sequentially and repeatedly outputted, selecting means connected to said status flags, for selecting one of said status data in response to said control signal to output the selected status data to an external circuit other than said CPU, and wherein said selecting means comprises:

a counter for counting said control signal; and a selector for selectively outputting said plurality of status data in response to the count of said counter.

2. A computer system according to claim 1, wherein said control signal generating means outputs said control signal to said external circuit to indicate one of the plurality of peripheral circuits corresponding to the selected status data.

3. A computer system according to claim 1, wherein said control signal generating means generates said control signal in response to a clock signal from said external circuit.

4. A method of acquiring a plurality of status data indicative of statuses of a plurality of peripheral circuits without interrupting the execution of a program by a CPU, comprising the steps of:

changing said plurality of status data of said plurality of peripheral circuits during the execution of the program by the CPU without direct relation to the execution of the program by the CPU, wherein the CPU can read said plurality of status data;

continuously generating a control signal independently from the execution of the program by said CPU, such that said plurality of status data are sequentially and repeatedly outputted;

counting said control signal; and selectively outputting said plurality of status data in response to the count.

5. A method according to claim 4, wherein said generating step includes continuously generating said control signal such that said plurality of status data are time-divisionally outputted.

6. A method according to claim 5, wherein said selectively outputting step includes:

decoding said count to provide a decoded result; and specifying one of said plurality of status data in accordance with the decoded result.

7. A method according to claim 5, further comprising the step of interrupting the execution of the program in response to said outputted status data.

8. A method according to claim 6, wherein said outputting step includes:

sequentially selecting one of said plurality of status data of said peripheral circuits based on the count; and outputting the selected status data to an external circuit and said generating step further includes outputting said control signal to said external circuit to indicate one of the plurality of peripheral circuits corresponding to the selectively outputted status data.

9. A method according to claim 4, wherein said generating step includes generating said control signal in response to a clock signal from said external circuit.

10. A method according to claim 4, further comprising the step of displaying said selectively outputted status data by said external circuit.

11. A computer system for a microcomputer system comprising:

a display unit;

a microcomputer system for executing a program, wherein said microcomputer system includes a central processing unit (CPU), a plurality of peripheral circuits, and a plurality of status data indicative of whether a state of each of said plurality of peripheral circuits has changed during the execution of the program, and said CPU is configured to read said plurality of status data;

a supervisor for receiving at least one of said plurality of status data from said microcomputer system independently from the execution of the program in said microcomputer and displaying the received status data on said display unit;

wherein said CPU executes the program;

said plurality of peripheral circuits respectively having status flags, each of which stores said status data of said corresponding peripheral circuit;

said microcomputer system further comprising:

control signal generating means for continuously generating a control signal independently from the execution of the program by said CPU, such that said plurality of status data are sequentially and repeatedly outputted;

selecting means connected to said status flags, for selectively outputting said plurality of status data to said supervisor in response to said control signal, and wherein said selecting means comprises:

a counter for counting said control signal; and a selector for selectively outputting said plurality of status data in response to the count of said counter.

12. A computer system according to claim 11, wherein said control signal generating means outputs said control signal to said supervisor to indicate one of the plurality of peripheral circuits corresponding to the selected status data, and said supervisor identifies the received status data based on said control signal.

13. A computer system according to claim 11, wherein said supervisor interrupts the execution of the program in said CPU when said supervisor detects from said selected status data that the state of one of said plurality of peripheral circuits corresponding to said selected status data is changed.

14. A computer system according to claim 11, wherein said supervisor issues a clock signal to said control signal generating means.

15. A computer system comprising:

a bus;

a central processing unit (CPU) for executing a program, said CPU being connected to the bus;

a plurality of peripheral circuits connected to the bus and respectively having status flags, each of which stores status data of a corresponding peripheral circuit, each status data being capable of being changed during the execution of the program by said CPU;

control signal generating means for continuously generating a control signal independently from the execution of the program by said CPU such that said plurality of status data are sequentially and repeatedly outputted; and selecting means connected to said status flags, for selecting one of said plurality of status data in response to said control signal to output the selected status data to an external circuit other than said CPU, wherein said selecting means comprises:
    a counter for counting said control signal; and
    a selector for selectively outputting said plurality of status data in response to the count of said counter.

16. A computer system according to claim 15, wherein said control signal generating means outputs said control signal to said external circuit.

17. A computer system according to claim 15, wherein said control signal generating means generates said control signal in response to a selection control signal from said external circuit.

18. A method of acquiring a plurality of status data indicative of statuses of a plurality of peripheral circuits without interrupting the execution of a program by a CPU, comprising the steps of:

setting said plurality of status data in said plurality of peripheral circuits during the execution of the program by the CPU;

generating a control signal independently from the execution of the program by said CPU; and selecting and outputting one of said plurality of status data in response to said control signal, and wherein said generating step includes continuously generating said control signal such that said plurality of status data are sequentially and repeatedly outputted, and wherein said selecting step includes:
    counting said control signal;
    decoding said count; and
    specifying one of said plurality of status data in accordance with a result of the decoding step.

19. A method according to claim 18, wherein said outputting step includes outputting the selected status data to an external circuit and said generating step further includes outputting said control signal to said external circuit.

20. A method according to claim 18, wherein said generating step includes generating said control signal in response to a clock signal from said external circuit.

21. A method according to claim 18, further comprising the step of displaying said selected status data by said external circuit.

22. A method according to claim 18, further comprising the step of interrupting the execution of the program in accordance with said outputted status data.

* * * * *